United States Patent
Kunikane et al.

(10) Patent No.: US 6,308,961 B1
(45) Date of Patent: Oct. 30, 2001

(54) GASKET FOR HARD DISK DRIVE UNIT USE

(75) Inventors: Takahiro Kunikane, Ageo; Sumihiko Yagenji, Itabashi-ku, both of (JP)

(73) Assignee: Kokoku Intech Co., Ltd., Tokyo (JP)

( * ) Notice: Subject to any disclaimer, the term of this patent is extended or adjusted under 35 U.S.C. 154(b) by 0 days.

(21) Appl. No.: 09/409,745

(22) Filed: Oct. 1, 1999

(30) Foreign Application Priority Data

Apr. 12, 1999 (JP) .................................................. 11-104095

(51) Int. Cl.[7] ...................................................... F16J 15/10
(52) U.S. Cl. .......................... 277/637; 277/644; 277/654; 360/106; 360/97.02
(58) Field of Search ...................................... 277/637, 639, 277/644, 650, 654, 584; 360/97.02, 106

(56) References Cited

U.S. PATENT DOCUMENTS

| | | | | |
|---|---|---|---|---|
| 3,720,420 | * | 3/1973 | Jelinek | 277/594 |
| 5,021,905 | * | 6/1991 | Sleger | 360/97.02 |
| 5,687,975 | * | 11/1997 | Inciong | 277/594 |
| 5,999,374 | * | 12/1999 | Kim | 360/106 |

FOREIGN PATENT DOCUMENTS

| | | |
|---|---|---|
| 6-89562 | 3/1994 | (JP) . |
| 8-218057 | 8/1996 | (JP) . |
| 9-159027 | 6/1997 | (JP) . |
| 9-282860 | 10/1997 | (JP) . |
| 11-328945 | 11/1999 | (JP) . |

* cited by examiner

*Primary Examiner*—Anthony Knight
*Assistant Examiner*—Enoch Peavey
(74) *Attorney, Agent, or Firm*—John Creighton Wray; Meera P. Narasimhan

(57) ABSTRACT

A purpose of the invention is to provide a gasket in use for HDD unit wherein a spatial continuity conducted from an interior of an HDD unit to an external open ambient for generating a leakage is prevented as well as an integrated manufacturing of a cover and a gasket member into a single constituent that has so far been separated into two constituents in a conventional structure, thereby not only reducing a number of assembly steps but also rendering manufacturing procedures easier that are attained by the present constitution, wherein: the gasket formed of an elastic member 3 is embedded in a base cover 1 formed of a stainless steel and included in a through-hole 2, which is opened on a desired portion of the base cover and penetrates from an internal surface to an external surface of the base cover, to be protruded further internally from the internal surface of the base cover as well as to be protruded further externally from the external surface of the base cover, thereby to seal an entire interior of the HDD unit, during that a metallic substrate 5 being laminated through a vibration suppressing member 4 made of a plastic resin onto an outside surface of the elastic member 3 which is protruded onto the external surface of the base cover 1.

7 Claims, 4 Drawing Sheets

GASKET FOR HARD DISK DRIVE UNIT USE

BACKGROUND OF THE INVENTION

1. Field of the Invention

The present invention relates to a gasket in use for hard disk drive (referred to as "HDD" hereinafter) unit and, in particular, to those in use for HDD unit which are integrally assembled with a cover case of an HDD unit.

2. Brief Description of the Prior Art

FIG. 7 (PRIOR ART) is a cross-sectional view showing a partial structure of an ordinary conventional gasket of this type. In FIG. 7, a numerical sign 11 stands for a metallic base cover, 14 stands for a plastic resin layer having a vibration suppressing function, 15 stands for a metallic substrate which is laminated through the plastic resin layer 14 onto an external surface (a rear surface in FIG. 7) of the metallic base cover 11. A through-hole 12 is opened on a desirable portion of the base cover 11 and penetrates from an internal surface (a front surface in FIG. 7) of the metallic base cover 11 to an outermost surface (a lowermost surface in FIG. 7) of the laminated metallic substrate 15. A rubber 13 is embedded in the through-hole 12, which penetrates through the metallic cover case 11, plastic resin layer 14 and the metallic substrate 15, to further protrude internally (upwardly in FIG. 7) toward a main body case of the HDD unit and to further protrude externally (downwardly in FIG. 7) to an open air ambient. A numerical and alphabetic character 13a represents aforesaid externally extruded portion of the rubber 13.

FIG. 8A (PRIOR ART) is a plan view and FIG. 8B (PRIOR ART) are a cross-sectional side view showing respectively a whole constitution of the conventional gasket mentioned above. The rubber 13 embedded in the metallic base cover 11 is provided with the desired shape and is stacked with the main body case of the HDD unit unshown in the figures on an opposite side of the externally protruded portion 13a thereby to seal an interior of the HDD unit.

However, since the protruded rubber portion 13a extrudes outwardly from the base cover 11 in the conventional gasket mentioned above, the rubber 13 is highly liable to be partially broken due to a contact with or an impact from obstacles which are located outside. When a breakdown of the rubber 13 begins at the outwardly extruded portion 13a then propagating into an inside of the rubber 13, a serious problem that a spatial continuity takes place from an internal sealed portion of the HDD unit through the broken portion of the rubber 13 and the through-hole 12 to the open air ambient which extends to be a leakage arises.

Since the through-hole 12 is provided entirely over the base cover 11, another problem that it is very difficult to open the through-hole (anchor-hole) if the metallic plates 11 and 15 are thick arises. On the other hand, when an adhesive is employed instead of the through-hole, a still another problem arises that gases included in the adhesive evaporate into the interior of the HDD unit.

SUMMARY OF THE INVENTION

The present invention is carried out to solve the problems mentioned above. An object of the invention is to provide a gasket in use for HDD unit which excludes completely an open air ambient thereby to be capable of preventing any leakage from generation, simultaneously does not necessiate to employ any adhesives and is easy to manufacture.

To satisfy the purposes mentioned above, the gasket in use for HDD unit according to the present invention is constituted as follows:

(1) A gasket in use for HDD unit, wherein:

aforesaid gasket is formed of an elastic member for sealing use which is embedded in a metallic base cover;

the elastic member is included in a through-hole, which is opened on a desired portion of the base cover and penetrates the base cover from an internal surface to an external surface of the base cover, and further extruded internally from the internal surface of the base cover toward a main body case of an HDD unit so as to take a desired shape as well as further extruded externally from the external surface of the base cover toward an open air ambient; and a metallic substrate is laminated through a vibration suppressing member onto an outside surface of the elastic member which is extruded onto the external surface of the base cover.

(2) A gasket in use for HDD unit, wherein:

aforesaid gasket is formed of an elastic member for sealing use which is embedded in a metallic base cover;

the elastic member is included in a through-hole, which is opened on a desired portion of the base cover and penetrates the base cover from an internal surface to an external surface of the base cover, and is extruded further internally from the internal surface of the base cover toward a main body case of an HDD unit so as to take a desired shape as well as is further extruded externally from the external surface of the base cover toward an open air ambient; and a metallic substrate is laminated onto an outside surface of the elastic member which is extruded onto the external surface of the base cover.

(3) A gasket in use for HDD unit, wherein:

aforesaid gasket is formed of an elastic member for sealing use which is embedded in a metallic base cover;

the elastic member is included in a through-hole, which is opened on a desired portion of the base cover and penetrates the base cover from an internal surface to an external surface of the base cover, and is extruded further internally from the internal surface of the base cover toward a main body case of an HDD unit so as to take a desired shape as well as is further extruded externally from the external surface of the base cover toward an open air ambient;

a metallic substrate is laminated onto an outside surface of the elastic member which is extruded onto the external surface of the base cover; and the metallic substrate is fixed with the base cover by means of caulking peripheries of the metallic substrate.

(4) A gasket in use for HDD unit, wherein:

aforesaid gasket is formed of an elastic member for sealing use which is disposed inside a metallic base cover;

the elastic member is extruded internally toward a main body case of an HDD unit so as to take a desired shape; and peripheries of aforesaid base cover is covered by surrounding with aforesaid elastic member.

(5) In constitutions described in (1)–(4), a vulcanized rubber having an sealing ability and an outgoing gas suppressing ability is employed as the elastic member.

(6) In constitutions described in (1)–(4), a thermoplastic elastomer having an sealing ability and an outgoing gas suppressing ability is employed as the elastic member.

DETAILED DESCRIPTION OF THE PREFERRED EMBODIMENTS

Hereinafter detailed are the preferred embodiments according to the present invention with reference to the drawings from FIG. 1 to FIG. 6B. The best modes contemplated by the inventors during carrying out the present invention into practice will also be described corresponding to the preferred embodiments.

Figure 1:
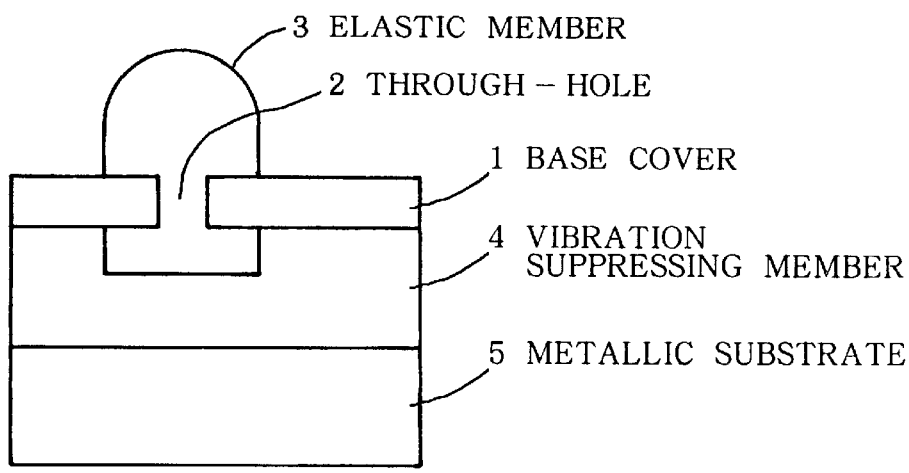
FIG. 1 is a cross-sectional side view showing a partial structure of Embodiment 1 according to the present invention.

FIG. 1 is a vertically cross-sectional view showing a partial structure of Embodiment 1 according to the present invention and illustrates major parts of a gasket constitution which is used for a cover case of an HDD unit.

In FIG. 1, a numerical sign 1 stands for a metallic base cover for embedding an elastic member 3 for sealing use in a through-hole 2, which is opened on a desirable portion of the base cover 1 and penetrates from an internal (an upper side in FIG. 1) surface to an external (a lower side in FIG. 1) surface of the base cover 1. Beside filling the through-hole 2, the elastic member 3 protrudes further internally from the internal surface of the base cover 1 and protrudes further externally from the external surface of base cover 1. Onto a further outside of the elastic member 3 which is protruded from the external surface of the base cover 1, a metallic substrate 5 is laminated through a vibration suppressing member 4.

Herein stainless steels are employed as materials in use for base cover 1 and metallic substrate 5, respectively, while plastic resins or elastomers are employed as materials in use for vibration suppressing member 4.

Figure 2A:
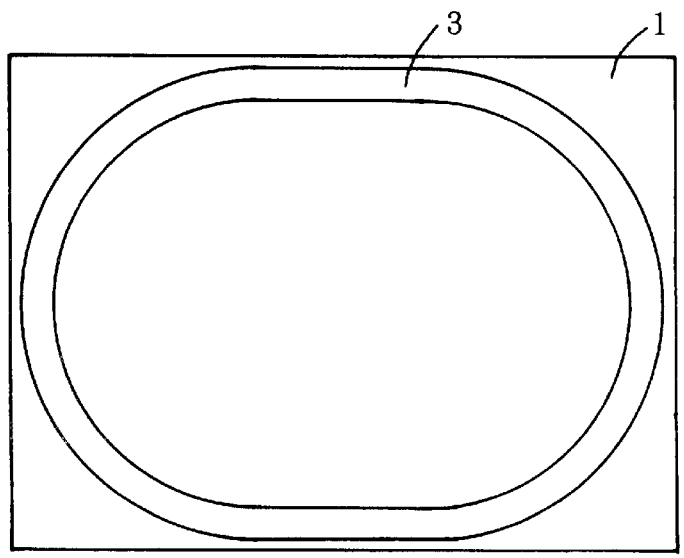
FIG. 2A is a plan view showing a schematic constitution of Embodiment 1.
Figure 2B:
FIG. 2B is a cross-sectional side view of FIG. 2A.

FIG. 2A is a plan view and FIG. 2B is a cross-sectional side view respectively showing a schematic constitution of the gasket mentioned above.

The gasket constituted as mentioned above is stacked with a main body case of the HDD unit to serve as the cover case similarly to the conventional case to seal an interior of the HDD unit by an aid of the elastic member 3 protruded internally. During sealing, the elastic members 3 takes a desirable shape fitted correspondingly to a shape of the HDD unit.

Herein in the present embodiment, since the elastic member 3 protruded outwardly from the base cover 1 is covered with the vibration suppressing member 4 and with the metallic substrate 5, the elastic member 3 does not contact with any obstacles to be liable to induce breakages, which might be resulted in spatial conduction from the interior of the HDD unit through the through-hole 2 to an exterior in the open-air ambient, thereby preventing a leakage from generation. Furthermore, since there is no necessity to utilize any sort of adhesives, either, evaporated gases scarcely invade into the interior of the cover case, thereby improving a reliability as a product.

In the present embodiment, since the through-hole 2 has to be opened not entirely through the respective layers but only through the base cover 1, there is no thickness restriction problem left, which makes a manufacturing technology of the products easy.

Figure 3:
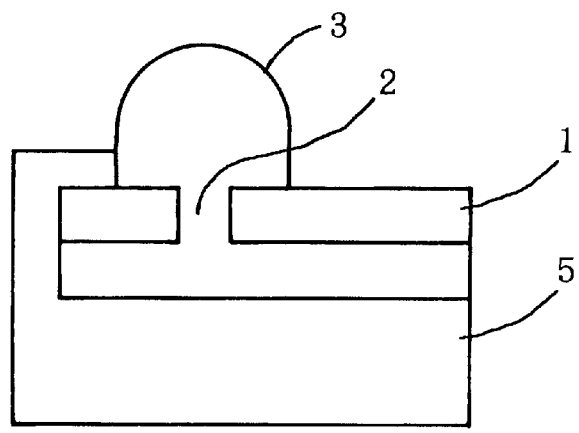
FIG. 3 is a cross-sectional side view showing a partial structure of Embodiment 2 according to the present invention.
Figure 4A:
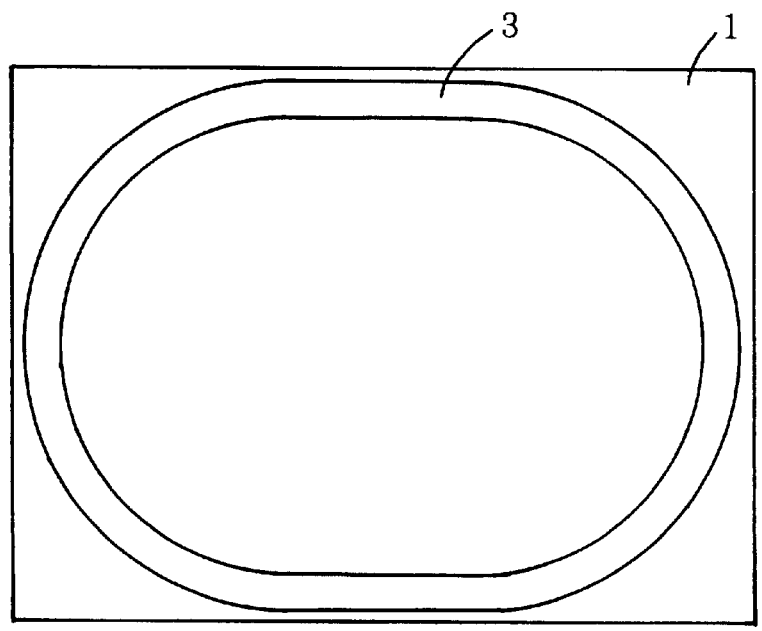
FIG. 4A is a plan view showing a schematic constitution of Embodiment 2.
Figure 4B:
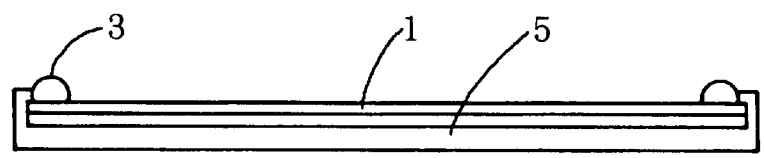
FIG. 4B is a cross-sectional side view of FIG. 4A.

FIG. 3 is a cross-sectional view of a partial structure of Embodiment 2 according to the present invention wherein the same numerical signs as those shown in FIG. 1 stand for the same constituents as those of FIG. 1. Herein FIG. 4A is a plan view showing schematic constitutions of FIGS. 3 and 4B are a cross-sectional side view of FIG. 4A.

The present embodiment is one substantially equivalent to the previous embodiment from which the vibration suppressing member 4 is omitted, wherein a metallic substrate 5 is laminated directly onto an outside surface of the elastic member 3 protruded from an external surface of a base cover 1. Further, the metallic substrate 5 is fixed on and integrated with the base cover 1 by means of caulking peripheral portions of the metallic substrate 5.

Moreover, the conventional base cover 11 and the conventional gasket member 13, which have been separated into two components so far, are converted to be a single component by means of manufacturing integrally thereby to reduce a number of assembly steps.

Even in this constitution, a leakage is preventable from generation and a fabrication technology is easy to handle as the same as the previous embodiment.

Figure 5:
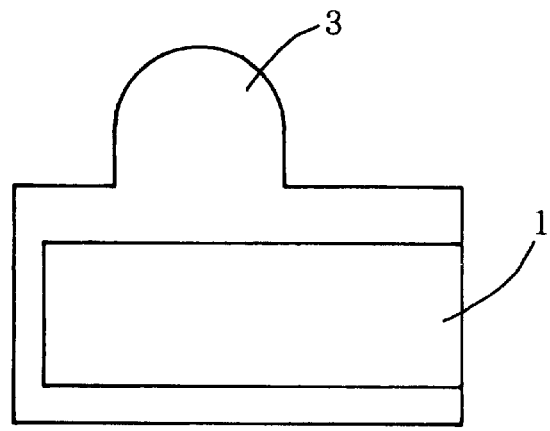
FIG. 5 is a cross-sectional side view showing a partial structure of Embodiment 3 according to the present invention.
Figure 6A:
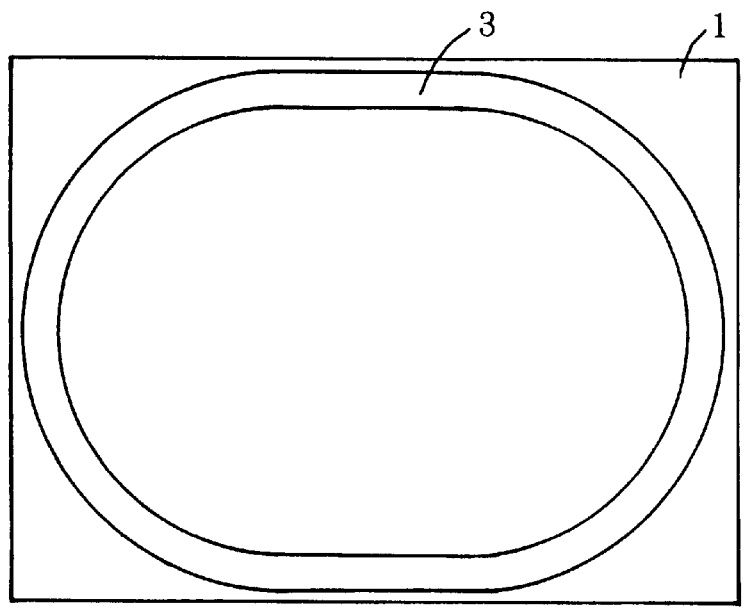
FIG. 6A is a plan view showing a schematic constitution of Embodiment 3.
Figure 6B:
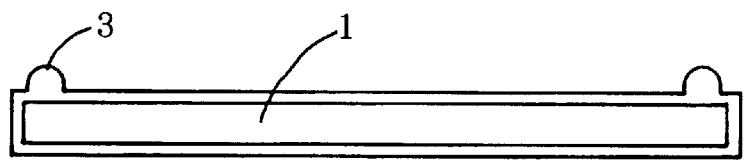
FIG. 6B is a cross-sectional side view of FIG. 6A.
Figure 7:
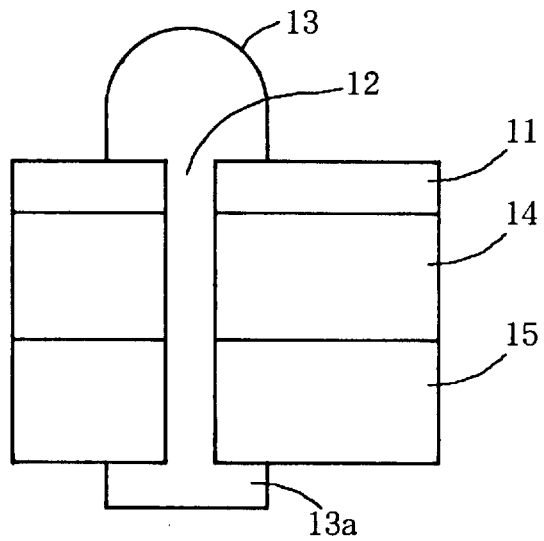
FIG. 7 (PRIOR ART) is a cross-sectional side view showing a partial structure of a conventional example.
Figure 8A:
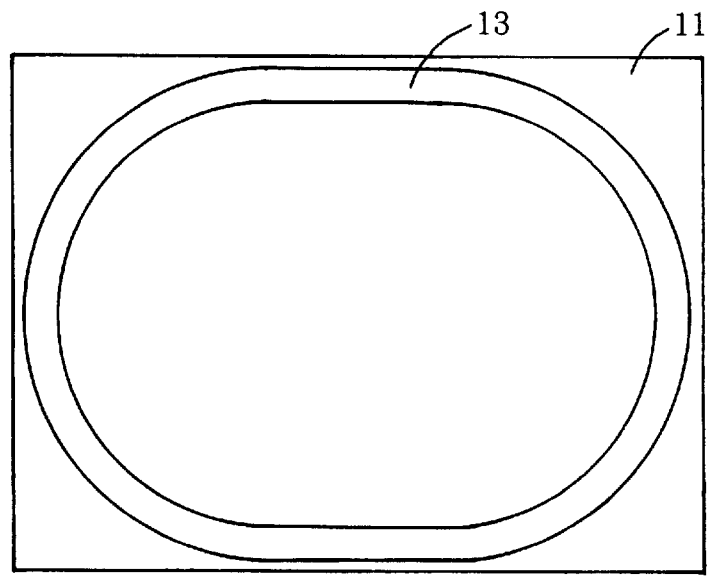
FIG. 8A (PRIOR ART) is a plan view showing a schematic constitution of the conventional example.
Figure 8B:
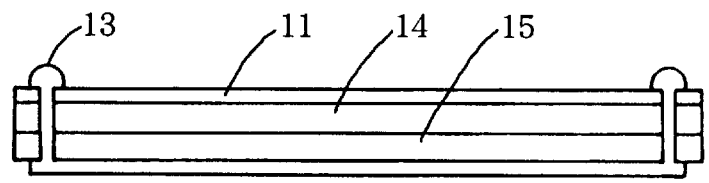
FIG. 8B (PRIOR ART) is a cross-sectional side view of FIG. 8A.

FIG. 5 is a cross-sectional side view showing a partial structure of Embodiment 3 according to the present invention. Meanwhile FIG. 6A is a plan view showing a schematic constitution of Embodiment 3 and FIG. 6B is a vertically cross-sectioned view of FIG. 6A.

In the present embodiment of a gasket constitution, a base cover 1 formed of a stainless steel is surrounded by an elastic member 3 on its peripheries.

Constituting a gasket assembly as mentioned above can not only prevent a leakage from generation but also make manufacturing steps easy and can afford a vibration suppressing function to the assembly, thereby buffering a shock even when a corner of the assembly contacts with other obstacles.

Incidentally, the elastic member 3 described in each embodiment mentioned above might be either a vulcanized rubber or a thermo-plastic elastomer so long as it has both an enough sealing ability and an excellent suppressing ability of gases against outgoing to satisfy a characteristic specification demanded from the HDD unit. As the vulcanized rubbers, fluorinated (referred to as "fluoro-") rubbers are used in general. However, an ethylene-propylene terpolymer (referred to as "EPDM"), an urethane rubber, a nitrile rubber, a butyl rubber, a butadiene rubber etc. might be available so long as they have abilities and characteristics mentioned above.

Effects of the Invention

As mentioned above, the constitutions according to the present invention can entirely seal out an external ambient thereby preventing the leakages from generation and have the effects of eliminating any necessity of employing adhesives, of making fabrication technology easier and of improvement in product reliability.

What is claimed is:

1. A gasket between a base cover and a main body case of an HDD unit, wherein:
    said gasket is formed of an elastic member for sealing use which is embedded in a metallic base cover;
    said elastic member is included in a through-hole, which is opened on a desired portion of said base cover and penetrates said base cover from an internal surface to an external surface of said base cover, and is further extruded internally from said internal surface of said base cover toward a main body case of an HDD unit so as to take a desired shape as well as is further extruded externally from said external surface of said base cover toward an open air ambient; and
    a metallic substrate is laminated through a vibration suppressing member onto an outside surface of said elastic member which is extruded onto said external surface of said base cover.

2. The gasket according to claim 1, wherein:
    a vulcanized rubber having a sealing ability and an outgoing gas suppressing ability is employed as said elastic member.

3. The gasket according to claim 1 wherein:
    a thermoplastic elastomer having a sealing ability and an outgoing gas suppressing ability is employed as said elastic member.

4. The gasket of claim 1, wherein the elastic member is disposed inside the metallic base members by insert molding or laminate molding.

5. A gasket between a base cover and a main body case of an HDD unit, wherein:
    said gasket is formed of an elastic member for sealing use which is embedded in a metallic base cover;
    said elastic member is included in a through-hole, which is opened on a desired portion of said base cover and penetrates said base cover from an internal surface to an external surface of said base cover, and is extruded further internally from said internal surface of said base cover toward a main body case of an HDD unit so as to take a desired shape as well as is extruded further externally from said external surface of said base cover toward an open air ambient; and
    a metallic substrate is laminated onto an outside surface of said elastic member which is extruded onto said external surface of said base cover.

6. A gasket between a base cover and a main body case of an HDD unit, wherein:
    said gasket is formed of an elastic member for sealing use which is embedded in a metallic base cover;
    said elastic member is included in a through-hole, which is opened on a desired portion of said base cover and penetrates said base cover from an internal surface to an external surface of said base cover, and is extruded further internally from said internal surface of said base cover toward a main body case of an HDD unit so as to take a desired shape as well as is extruded further externally from said external surface of said base cover toward an open air ambient;
    a metallic substrate is laminated onto an outside surface of said elastic member which is extruded onto said external surface of said base cover; and
    said metallic substrate is fixed onto said base cover by means of caulking peripheries of said metallic substrate.

7. A gasket between a base cover and a main body case of an HDD unit, wherein:
    said gasket is formed of an elastic member for sealing an opening, said opening being disposed inside a metallic base cover;
    said elastic member is extruded internally toward a main body case of an HDD unit so as to take a desired shape; and
    peripheries of said base cover is covered by surrounding with said elastic member.

* * * * *